US008112225B2

(12) United States Patent
Eidehall et al.

(10) Patent No.: US 8,112,225 B2
(45) Date of Patent: Feb. 7, 2012

(54) METHOD AND SYSTEM FOR COLLISION AVOIDANCE

(75) Inventors: Andreas Eidehall, Gothenburg (SE); Jochen Pohl, Grimstad (NO)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 12/955,041

(22) Filed: Nov. 29, 2010

(65) Prior Publication Data
US 2011/0071731 A1 Mar. 24, 2011

Related U.S. Application Data

(63) Continuation of application No. 11/851,642, filed on Sep. 7, 2007, now abandoned.

(30) Foreign Application Priority Data
Sep. 8, 2006 (EP) .................................. 06120392

(51) Int. Cl.
G08G 1/16 (2006.01)
G01S 13/00 (2006.01)
G01S 3/02 (2006.01)
B60Q 1/00 (2006.01)

(52) U.S. Cl. .......... 701/301; 342/66; 342/147; 342/455; 340/436

(58) Field of Classification Search .................. 701/301; 342/43–51, 65–66, 69, 76, 77, 94–97, 104–118, 342/126, 139, 146, 147–158, 357.06, 357.08, 342/454, 455; 340/436, 444, 465, 466
See application file for complete search history.

(56) References Cited

U.S. PATENT DOCUMENTS

| 6,269,307 | B1* | 7/2001 | Shinmura et al. | 701/301 |
| 7,161,472 | B2* | 1/2007 | Strumolo et al. | 340/436 |
| 2002/0087241 | A1* | 7/2002 | Nakano et al. | 701/41 |
| 2003/0204299 | A1* | 10/2003 | Waldis et al. | 701/96 |
| 2005/0096826 | A1* | 5/2005 | Iwasaka et al. | 701/70 |
| 2005/0225477 | A1* | 10/2005 | Cong et al. | 342/70 |
| 2006/0149462 | A1* | 7/2006 | Sawamoto et al. | 701/207 |

FOREIGN PATENT DOCUMENTS
WO 0194970 12/2001
WO 0195141 12/2001

OTHER PUBLICATIONS

Broadhurst, Baker, Kanade, "Monte Carlo Road Safety Reasoning", IEEE Intelligent Vehicle Symposium( IV 2005), Jun. 2005, pp. 319-324.*
Broadhurst, Baker, Kanade, "Monte Carlo Road Safety Reasoning," IEEE Intelligent Vehicle Symposium (IV 2005), Jun. 2005, pp. 319-324.
"An Automotive Lane Guidance System" Eidehall, Dept. of Electrical Engineering, Linkopings Universitet, SE 581 83 Linkoping, Sweden, 97 pages.

* cited by examiner

Primary Examiner — James Trammell
Assistant Examiner — Muhammad Shafi
(74) Attorney, Agent, or Firm — Brooks Kushman P.C.

(57) ABSTRACT

A method for collision avoidance for a host vehicle includes the following steps; receiving input data relating to a set of objects external to the host vehicle, wherein an object position $(r,\Phi)$, and an object velocity $(\dot{r})$ are associated with each object by a sensor system arranged on the host vehicle, then estimating future trajectories of each external object, while considering influence by the future trajectories of the other external objects.

18 Claims, 3 Drawing Sheets

METHOD AND SYSTEM FOR COLLISION AVOIDANCE

This application is a continuation of U.S. application Ser. No. 11/851,642 filed Sep. 7, 2007. The disclosure of which is incorporated in its entirety by reference herein.

TECHNICAL FIELD

The invention relates to a method and an on board system for collision avoidance.

BACKGROUND ART

In order to increase safety in traffic active as well as passive systems for further improving safety in traffic are continuously developed. Passive safety systems are directed toward reducing the effect of an accident, in the event an accident takes place while active safety systems are directed toward reducing the probability of occurrence of accidents. One type of active safety systems are collision avoidance systems relying on sensor technology for estimating a traffic situation. In this type of systems sensors are used to detect the presence of objects in a future trajectory of the vehicle. In the event the system detects that an object is within a future trajectory of the vehicle, normally a warning sign is produced to alert the driver. Systems that intercept the control of the vehicle, such as by braking the vehicle are also known.

In most known collision avoidance systems and methods, future trajectories of all detected object are estimated and compared with the future trajectory of the vehicle. In the event the future trajectory of an object coincides with the future trajectory of the vehicle, a conflict event is detected. The future trajectories of the detected objects are based on position and velocity of the objects. Normally position and velocity are detected by use of sensors such as radars. In order to separate between large and small objects, between objects made of metal from concrete or animals object recognition based on input signals from cameras may be used. As soon as the velocity and position has been detected by the radar, and it has been verified that the detected object is a potentially dangerous object, and not for instance a flying insect or paper litter whirling round, the future trajectory of the object is estimated primarily from input data relating to the position and velocity of the object in question. However, the future trajectory of the object may drastically change due to influence from other objects on the road. In the article, "Monte Carlo Road Safety Reasoning", Broadhurst, A., Baker, S., Kanade, T. Monte Carlo road safety reasoning, Proceedings of the IEEE Intelligent Vehicles Symposium 2005, 6-8 Jun. 2005, Page(s): 319-324, Las Vegas, Nev., USA, a method is disclosed in which the future trajectory of an object is influenced by the traffic situation, that is by the future trajectories of other objects present on the road. The invention relates to a system and method for collision avoidance wherein the future trajectories of external objects are influenced by the traffic situation. In the Broadhurst article the following use of the system in the host vehicle is suggested: closed loop control of the vehicle for selecting the best predicted action, display of the best action to take in order to advice the driver, or display of warning signs for objects or unsafe regions of the road. However, in the event the control system suggested in this article is used to intercept in the control of the host vehicle by using the best predicted action for control of the host vehicle, the host vehicle will be run by an autopilot. Such solutions are generally not accepted for legal reasons and are furthermore mot appreciated by drivers. Even though the system and method described in, "Monte Carlo Road Safety Reasoning" has contributed with an important advance in object tracing and future path determination, there is still a need for improvements as regards the use of the information generated by the future trajectory estimator.

SUMMARY

It is an object of the invention to further reduce the risk for unsafe manoeuvres in a method or system for collision avoidance which estimates future trajectories of detected external objects It is particular an object of the invention to further reduce the risk for unsafe manoeuvres in a system where future trajectories of each external object are estimated while considering influence by the future trajectories of the other external objects.

The object of the invention is achieved by selecting an appropriate method of interception of vehicle control as a result of a detected risk for collision in between the host vehicle and an external object in a neighbouring lane into which the host vehicle makes an attempt to enter.

In a system or method according to the invention the following actions are taken estimating future trajectories of the external objects under consideration of the traffic situation, that is a future trajectory of an external object is influenced by the future trajectories of other external objects present on the road:

determining, by use of a lane exit control block, whether the driver is making an attempt to exit the lane;

determining, by use of a future conflict estimator control block, if the future trajectory of the host vehicle is involved in a conflicting event in the neighbouring lane; and applying, by the use of a lane change prevention unit, a torque in the direction against a torque generated by a driver to effect a lane change in the event said future conflict estimator control block detects a conflict event of relevance for the host vehicle in the lane into which the driver attempts to enter.

The method and system for collision avoidance according to the invention ensures that the driver has control over the host vehicle under most conditions while reducing the risk for collision under a well defined operation which is associated with increased risk, that is when a driver attempts to leave a lane.

In a particularly preferred embodiment of the invention the future trajectories for external objects are determined by the following method steps:

receiving input data relating to a set of objects external to said host vehicle, said objects being positioned within a detecting range of said sensor system, wherein an object position $(r,\Phi)$, and an object velocity $\dot{r}$ are associated with each object in said set of objects by a sensor system arranged on a host vehicle, said input data defining a current state of each object, associating a plurality of future control input signals with each moving object, where each future control signal will generate together with the current state of each moving object a separate future path in a state update equation, determining, by the use of a future trajectory estimator, future trajectories for each of the objects, by selecting one of the most probable future paths as the future trajectory, In an embodiment of the invention the method described in the Broadhurst article in order to generate the future trajectories of external moving objects may be used. However, a generated future path will not be used to steer the host vehicle as suggested in the Broadhurst article. Instead interception of host vehicle control will be performed as suggested in the characterising portion of claim 1, which will reduce the risk of collision in a specified situation associated with a high risk.

In other embodiments of the invention the method step of estimating future trajectories of each external object, while considering influence by the future trajectories of the other external objects may include the following method step:

determining whether any of future trajectories of external objects will mutually effect each other due to a risk of conflict in between the future trajectories of at least one pair of objects.

determining if the conflict event has an impact of the future trajectory of the host vehicle.

BRIEF DESCRIPTION OF DRAWINGS

An embodiment of the invention will be described in further detail below, with references to appended drawings where.

DETAILED DESCRIPTION

Figure 1:
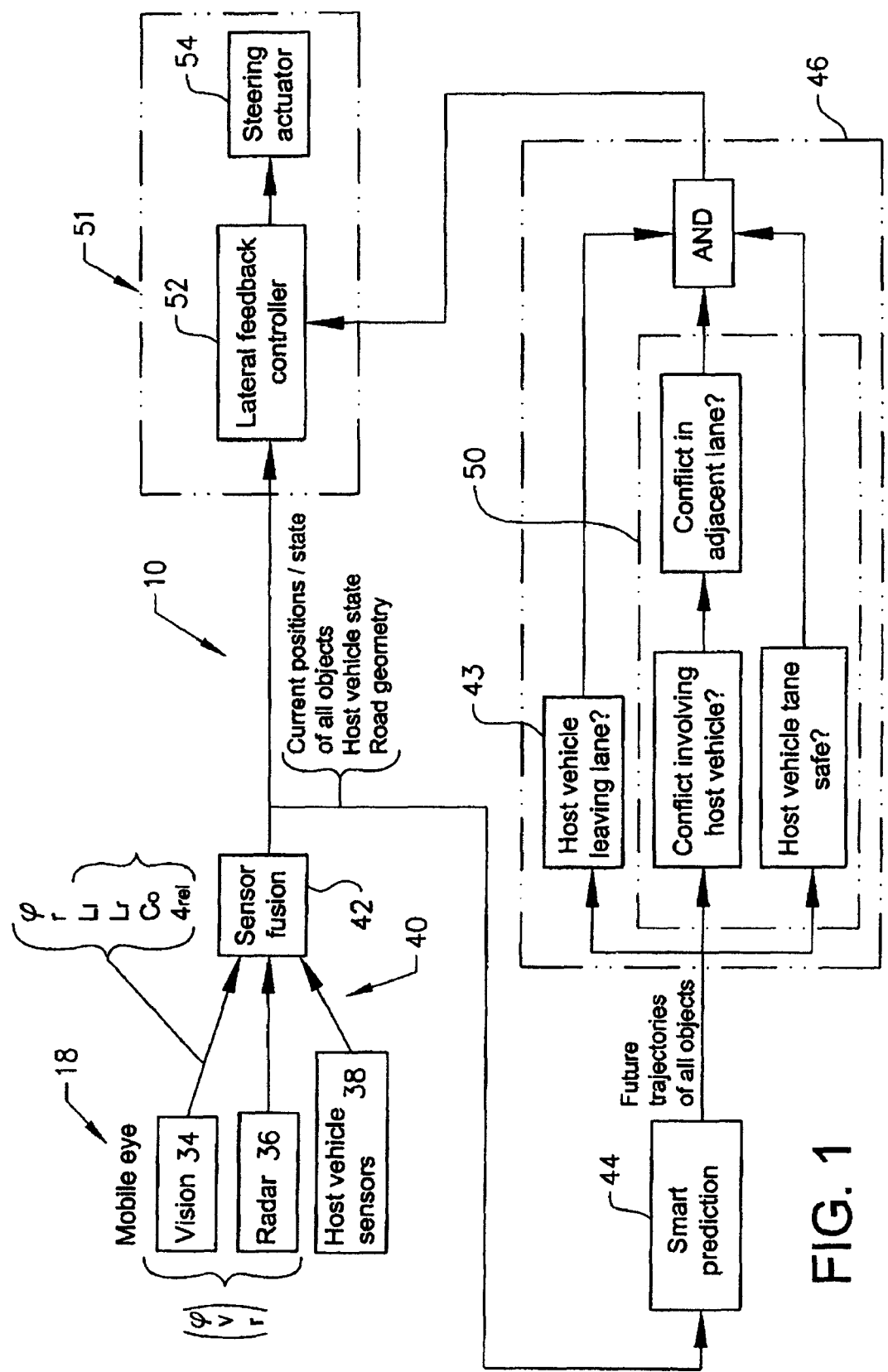
FIG. 1 shows a block scheme of a system for collision avoidance according to the invention.
Figure 2:
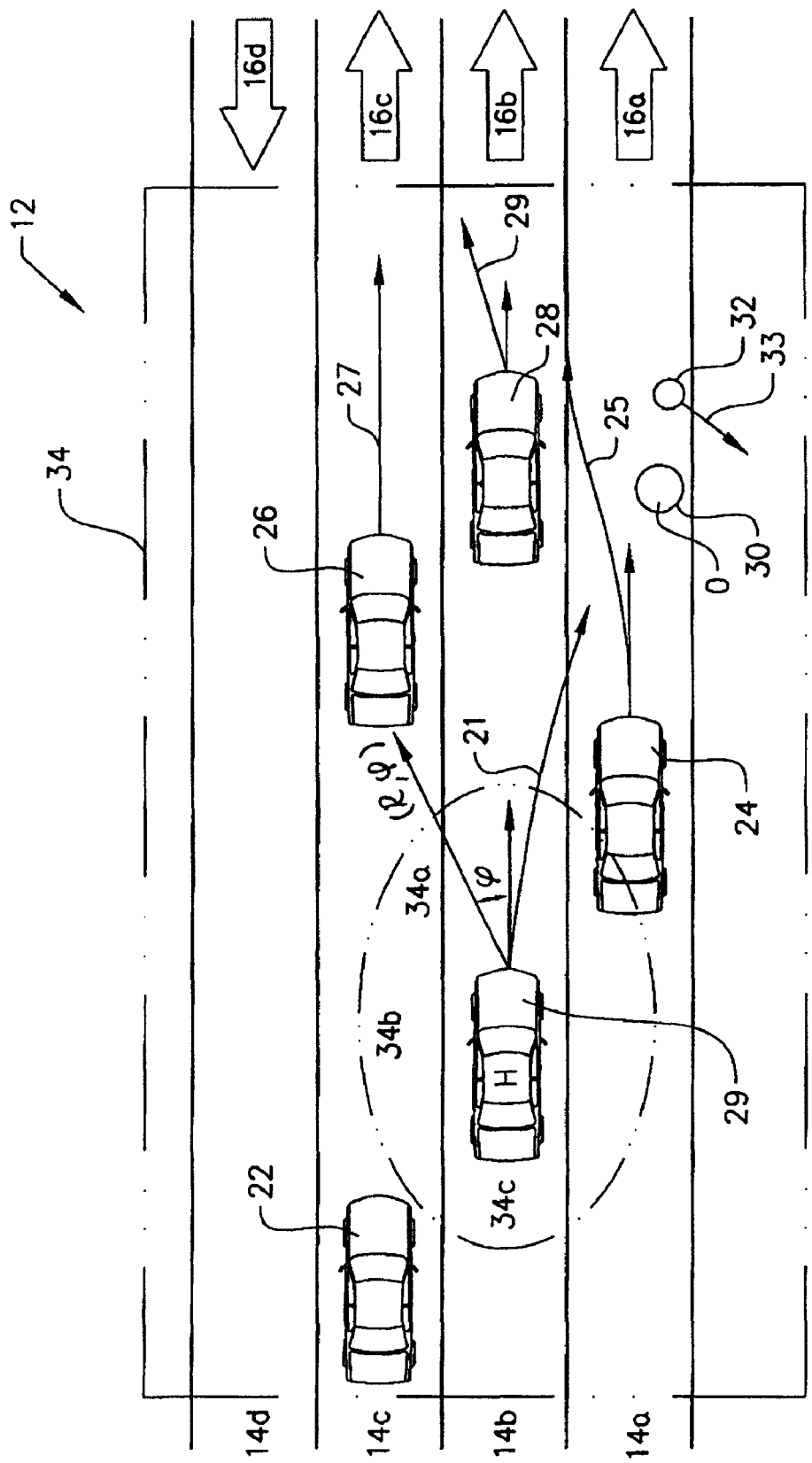
FIG. 2 shows an example of a traffic situation on a road

An embodiment of the invention will be described below with references to FIGS. 1 and 2. In FIG. 1 a block scheme of a system 10 for collision avoidance is shown. FIG. 2 shows an example of a traffic situation on a road 12. The road example 12 includes four lanes 14a-14d, where lanes 14a-14c are intended for traffic going in the direction from left to right as indicated by arrows 16a-16c and the lane 16d is intended for traffic going in the direction from right to left as indicated by arrow 16d. The system 10 for collision avoidance 10 includes a sensor system 18 arranged on a host vehicle 20. The sensor system 18 is arranged to receive input data relating to a set of objects external 22, 24, 26, 28, 30, 32 of the host vehicle 20. The objects 22, 24, 26, 28, 30, 32 are positioned on the road 12 within a detecting range 34 of the sensor system 18. At least an object position (r,Φ) and an object velocity (ṙ) is associated with each object in said set of objects 22, 24, 26, 28, 30, 32. The set of object may include different type of objects such as obstacles 30, pedestrian or animals 32 and vehicles 22, 24, 26, 28. The vehicles 24, 26, 28 may be of different type and size, such as bikes, motorbikes, trucks and cars. Different types of objects may preferably be associated with different types of behaviour as will be explained in further detail below.

Future trajectories 25,27,29, 33 are estimated in a future trajectory estimator, which will be explained in further detail below. For obstacles 30, the future trajectory will be estimated as no movement, that is a 0 vector indicated by reference number 0. A future trajectory of the host vehicle is denoted by arrow 21.

The detecting range 34 of the sensor system 18 predominantly includes a region 34a in front of the vehicle, but may preferably also include a region 34b beside the vehicle and a region 34c behind the vehicle. As have been indicated in the figure, the region 34a in front of the vehicle is generally substantially larger than the region 34c behind the vehicle. The detecting range 34 preferably has some directivity so as to extend further in a main lobe having an angle with the heading direction of the vehicle in the interval between approximately ±30° than in directions outside the main lobe. It is suitable that the detecting range within the main lobe stretches at least 75 m, preferably at least 150 m and suitably approximately 300 m from the vehicle 20.

The sensor system 18 preferably includes different types of sensors. In the embodiment shown in FIG. 1, the sensor system includes a vision type sensor 34, a radar 36 and a set of host vehicle sensors 38. The vision type sensor 36 preferably generates output data including distance to the object (r), direction to the object (Φ), distance to the right edge of the lane ($L_R$) of the host vehicle, distance to the left edge of the lane ($L_L$) of the host vehicle, curve radius ($c_0$) of the road at the current position of the host vehicle, heading direction ($\Psi_{rel}$) of the host vehicle relative to the lane and a classification of the object type. The classification of the object type may be based on image recognition of objects. The objects may be classified into obstacles 30, pedestrian or animals 32 and vehicles 24, 26, 28. The vehicles 24, 26, 28 may be of different type and size, such as bikes, motorbikes, trucks and cars. A vision sensor suitable for the collision avoidance system 10 is provided under the tradename Mobil Eye. The radar 36 provided output data including object position (r,Φ), an object velocity ṙ. The object velocity (ṙ) is defined by a magnitude |ṙ| and direction of movement (ṙ)/|ṙ|. The host vehicle sensor preferably generates output data including host vehicle velocity (v), host vehicle yaw rate ($\dot{\Psi}_{abs}$) and host vehicle steering angle (θ). Host vehicle sensors capable of providing such output data are well known in the art. The output data 40 from the sensor system 18 are preferably treated by an object and road tracking block 42. The object and road tracking block may advantageously be a state estimator which estimates the states of all objects and the host vehicle and the road geometry. The states of the objects may include all data provided from the sensor system. The state estimator 42 is preferably arranged as a Kalman Filter based tracking system estimating at least the current object position ($x_i, y_i$), the current object velocity ($v_i$), for all objects detected by the sensor system; the current host vehicle velocity (v) and the current host vehicle heading direction ($\Psi_{rel}$) and the road geometry such as curve radius ($c_0$) and lane width (W).

For the purpose of tracking the external objects the system may comprise a road geometry tracking unit which is arranged to determine the geometry of the road on which the vehicle is travelling and to express said geometry of the road as a curved coordinate system which follow the lane or lanes of said road, and in that said object position, object velocity and object direction of movement are expressed relative to said curved coordinate system.

A suitable state estimator for this purpose may be the state estimator described in "An Automotive Lane Guidance System", Andreas Eidehall, thesis 1122 at Linköping University 2004. In particular it is referred to the measurement equations 5.6a and 5.6b.

Expressed in the variables introduced above we have:

$$L_{Lt}^m = -W_t/2 - y_{off,t} + e_{1,t}$$

$$L_{Rt}^m = W_t/2 - y_{off,t} + e_{2,t}$$

$$\Psi_{rel,t}^m = \Psi_{rel,t} + e_{3,t}$$

$$c_{0l,t}^m = c_{0,t} + e_{4,t}$$

$$\begin{pmatrix} r_t^{j,m} \\ \phi_t^{j,m} \end{pmatrix} = T(x_t^j, y_t^j) + \begin{pmatrix} e_{5,t} \\ e_{6,t} \end{pmatrix}^i,$$

where T transforms from a coordinate system x, y following the road geometry into a coordinate system (r, Φ) centred at the host vehicle. The variables ($e_1, \ldots e_6$) are stochastic measurement noise. W represents the width of the lane. Superscripts m denotes measured quantities. $y_{off}$ represents the distance from the middle of the lane.

Expressing the curve radius of the road as $R=1/(c_0+c_1 x)$ and assuming $\dot{c}_1=0$, the time continuous motion equations for the host vehicle states will be:

$$\dot{W}=0$$

$$\dot{y}_{off}=v\Psi_{rel}$$

$$\dot{\Psi}_{rel}=vc_0+\dot{\Psi}_{abs}$$

$$\dot{c}_0=vc_1$$

$$\dot{c}_1=0$$

Based on the model above an observer may be constructed using the following matrix definitions:

$$A_{host} = \begin{pmatrix} 1 & 0 & 0 & 0 & 0 \\ 0 & 1 & vT_s & v^2T_s^2/2 & v^3T_s^3/6 \\ 0 & 0 & 1 & vT_s & v^2T_s^2/2 \\ 0 & 0 & 0 & 1 & vT_s \\ 0 & 0 & 0 & 0 & 1 \end{pmatrix}$$

$$A_{obj} = \begin{pmatrix} 1 & T_s & 0 \\ 0 & 1 & 0 \\ 0 & 0 & 1 \end{pmatrix} \quad A = \begin{pmatrix} A_{host} & 0 \\ 0 & I_N \oplus A_{obj} \end{pmatrix}$$

$$B_{host} = \begin{pmatrix} 0 & 0 \\ vT_s^2/2 & 0 \\ T_s & 0 \\ 0 & 0 \\ 0 & 0 \end{pmatrix} \quad B_{obj} = \begin{pmatrix} 0 & T_s^2/2 \\ 0 & T_s \\ 0 & 0 \end{pmatrix}$$

$$B = \begin{pmatrix} B_{host} \\ B_{obj} \\ \vdots \\ B_{obj} \end{pmatrix} \quad C_{host} = \begin{pmatrix} -1/2 & -1 & 0 & 0 & 0 \\ 1/2 & -1 & 0 & 0 & 0 \\ 0 & 0 & 1 & 0 & 0 \\ 0 & 0 & 0 & 1 & 0 \end{pmatrix};$$

where N is the number of objects, $T_s$ is the sample time. Furthermore the following vectors are defined $$x_{host,t} = \begin{pmatrix} W \\ y_{off} \\ \Psi_{rel} \\ c_0 \\ c_1 \end{pmatrix}_t \quad x_{obj,y}^i = \begin{pmatrix} x^i \\ v^i \\ y^i \end{pmatrix}_t \quad r_t = \begin{pmatrix} 0 \\ r_{obj}^1 \\ r_{obj}^2 \\ \vdots \\ r_{obj}^N \end{pmatrix}$$

$$y_{host,t} = \begin{pmatrix} L_L^m \\ L_R^m \\ \Psi_{rel}^m \\ c_0^m \end{pmatrix}_t \quad y_{obj,t}^i = \begin{pmatrix} \varphi_i^m \\ r_i^m \end{pmatrix}_t \quad y_t = \begin{pmatrix} y_{host} \\ y_{obj}^1 \\ y_{obj}^2 \\ \vdots \\ y_{obj}^N \end{pmatrix}_t$$

-continued $$u_t = \begin{pmatrix} \Psi_{abs,t} \\ a_{host,t}\cos\Psi_{rel,t} \end{pmatrix}$$

Introducing $$h(x_t) = \begin{pmatrix} C_{host}x_{host,t} \\ T(x_{obj,t}^1) \\ \vdots \\ T(x_{obj,t}^N) \end{pmatrix}$$

and the following process and measurement covariance matrices:

$$Q = \begin{pmatrix} Q_{host} & 0 \\ 0 & I_N \oplus Q_{obj} \end{pmatrix} \quad R = \begin{pmatrix} R_{host} & 0 \\ 0 & I_N \oplus R_{obj} \end{pmatrix};$$

where $Q_{host}$ and $Q_{obj}$ are the process noise covariance matrices for the object states and $R_{host}$ and $R_{obj}$ are the measurement noise covariance matrices for the host and object measurement.

The measurement equations and motion equations can now be rewritten as $$x_{t+1}=Ax_t+Bu_t+w_t$$

$$y_t=h(x_t)+e_t$$

A recursive one step predictor in the form of a Kalman filter will have the following appearance:

$$\hat{x}_{t+1}=A(\hat{x}_t+K_t[y_t-h(\hat{x}_t)])+Bu_t$$

as an observer to the combined target geometry system $$x_{t+1}=Ax_t+Bu_t+w_t$$

$$y_t=h(x_t)+e_t$$

The extended Kalman Filter will be provided with a feedback $K_t$.

The following equations are the extended Kalman Filter equations for a non-linear measurement equation:

$$C_t=D_xh(\hat{x}_{t|t-1})$$

$$K_t=P_{t-1}C_t^T(C_tP_{t-1}C_t^T+R)^{-1}$$

$$P_t=AP_{t-1}A^T+Q-AK_tC_tP_{t-1}A^T$$

where $$[D_xh]_{ij} = \frac{\partial h_i}{\partial x_j}$$

Further details about the state estimator 42 is provided in "An Automotive Lane Guidance System", Andreas Eidehall, thesis 1122 at Linköping University 2004.

The output from the state estimator is used in a future trajectory estimator 44 which is arranged to estimate the future trajectory for each of the objects. According to the invention it is necessary that risk of conflicting events between individual objects in the set of objects detected by the sensor system 18 are assessed by the future trajectory estimator 44. Two general types of future trajectory estimators capable of including the mutual influence from external objects when estimating the future trajectory of an external object are known. A first type in which the future trajectory of an external object is corrected in a most likely fashion when a conflict event is detected. One example of this type of future trajectory estimator is disclosed in the Broadhurst article referred to above. The correction may be made to avoid the conflict event, or in the event this is not possible due to physical restraints such as available steering possibilities, surface friction, acceleration, etc, the correction is made to reduce the effect of the conflict event.

In another type of future trajectory estimator, it is simply noted that a conflicting event occurs between two external objects. It is thereafter determined whether this conflict event will have an impact of the host vehicle or not. In both these systems the future trajectory estimator determines whether any of the future trajectories the external objects will mutually effect each other due to a risk of conflict in between the future trajectories of at least one pair of objects. In most known collision avoidance systems, interaction between the detected objects is not observed.

In most prior art systems normally only conflicting events between each object and the host vehicle are observed. In one embodiment of the invention the future trajectory estimator 44 is of the type described in the article "Monte Carlo Road Safety Reasoning", by Broadhurst et al. referred to above.

In an embodiment of a future trajectory estimator 44 of this type, each object type is assigned certain restrictions of movement. For instance obstacles will not move, pedestrians may move independently in the x and y directions, while cars are restricted to turn with a curvature radius restricted to possible steering angles. Starting with an initial state, which in one embodiment of the invention is determined by the object and road tracking block 42, the future trajectory estimator first generates set of future trajectories for each object, which set of future trajectories may include all possible future control inputs selected from a set of typical human driver actions under consideration of the boundary conditions due to the restrictions of movement of the objects. These set of typical driver actions include stop, stop and turn, change lane, corner, overtake and random. For each possible future trajectory a certain risk is assigned. Alternatively, the control input may be restricted to a selection of a plurality of values of one or more variables, wherein said values are selected within a predetermined interval. Preferably acceleration and steering angle are used as input variables. Among all possible future trajectories, the trajectories that minimizes the risk for conflict between all future trajectories is selected as the most probable future trajectories. In order to evaluate the probability of danger for all possible future trajectories, and thus find the future trajectories for the detected objects that has the minimal the risk for conflict between the trajectories a Monte-Carlo sampling algorithm may suitable be selected.

Figure 3:
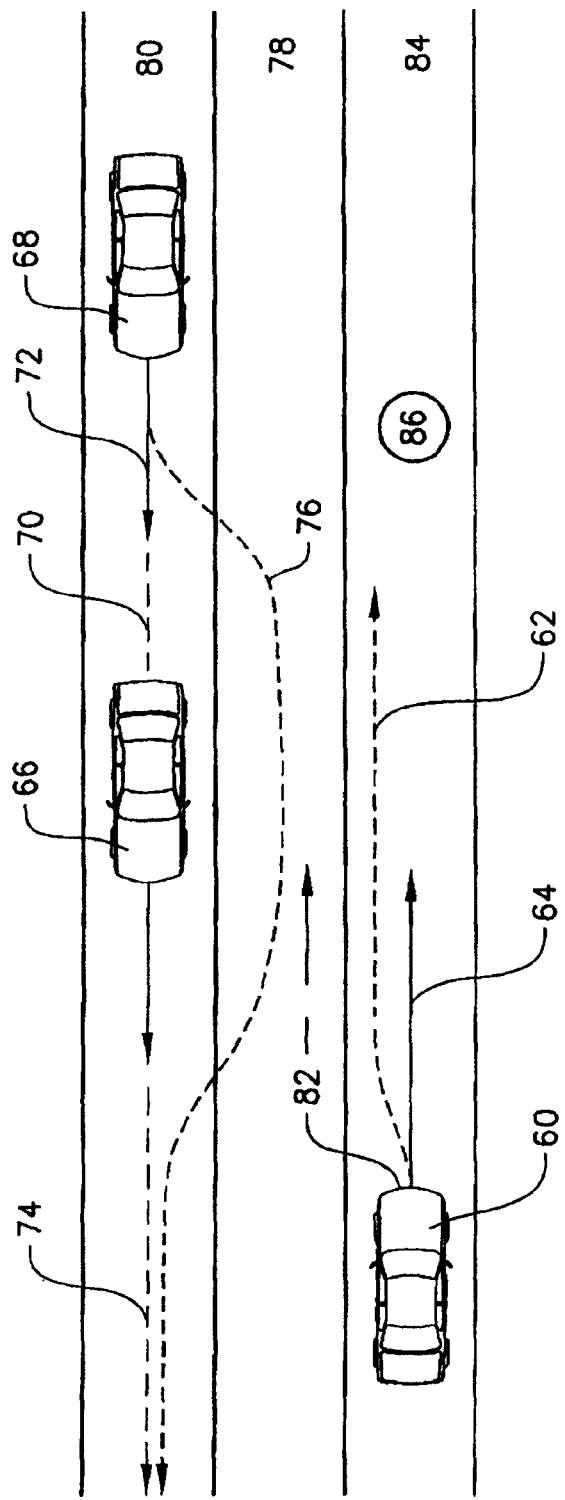
FIG. 3 shows another example of a traffic situation on a road

FIG. 3 shows a flow scheme describing the operation of an embodiment of a future trajectory estimator 44.

In a first operational sequence S1 a plurality of objects having a position $\bar{x}_i(t)$, a velocity $\bar{v}_i(t)$ and a class of input control signals $\bar{u}(t)$. The input control signals may be of different types for different types of objects. The different types of objects may advantageously include obstacles, pedestrians and cars.

In a second operational sequence S2 a state update equation is defined for each c. The state update equation may be described as $\bar{s}(t)=f(\bar{s}(t), \bar{u}(t))$. Obstacles will have a state update equation $\dot{\bar{s}}(t)=0$ for the state $\bar{s}(t)=[x\ y\ \theta]$. Pedestrians will have a state update equation $[\dot{s}_1\ \dot{s}_2\ \dot{s}_3\ \dot{s}_4]^T=[s_1\ s_2\ u_1\ u_2]^T$, where $[u_1, u_2]^T=[a_x\ a_y]^T$, a denotes a random acceleration. The state is defined as $[s_1\ s_2\ s_3\ s_4]^T=[x\ y\ \dot{x}\ \dot{y}]^T$.

Cars will have a state update equation $[\dot{s}_1\ \dot{s}_2\ \dot{s}_3\ \dot{s}_4]^T=[s_3\ \cos s_4\ s_3\ \sin s_4\ u_1\ (s_3\ \sin u_2)/L]^T$, where $[u_1 u_2]_T=[a\ \theta]^T$. a denotes acceleration and θ denotes steering angle. The state is defined as $[s_1\ s_2\ s_3\ s_4]^T=[x\ y\ v\ \phi]^T$, where v is the velocity and φ is the orientation. $L=R \sin \theta$, where R equals the turning radius of the car.

In a third operational sequence S3 a plurality of future control input signals is associated with each object. For pedestrians, this amount to selection of a set of values of accelerations within a predetermined interval. For cars this amounts to selection of a set of values of accelerations and steering angles within predetermined intervals. A plurality of values are selected at each step in a plurality of discrete time steps together forming a prediction horizon. The selection may be performed by random or include a set of typical inputs defining typical manoeuvres such as corner, lane change, overtake and emergency stop. Preferably random input is combined with the typical inputs.

In a fourth operational sequence S4 a probability number is associated with each selected value. The probability number may be determined from a stored map describing the probability as a function of the input variable In a fifth operational sequence S5 a future path is calculated by use of the selected values. A plurality of future paths is thus created for each object.

In a sixth operational sequence S6 a future trajectory is selected as one of the most probable future paths, preferably the most probable future path. This is done by calculating the aggregate probability value for the selected values at each step in a plurality of discrete time steps forming the prediction horizon. Future paths leading to conflicting events between objects may be removed in this sixth operational sequence, or in an operational sequence S6' prior to the sixth operational sequence.

The operational sequences S1-S6 may be performed in a future trajectory estimator 44 of the type described in the Broadhurst reference. The future trajectory estimator would then include first to sixth means for performing the first to sixth operational sequences described above.

In FIG. 3 an example of a traffic situation which explains the importance of assigning also conflicting events between individual objects in the set of objects detected by the sensor system 18 and not only detect possible conflicting events between the future trajectories of the each set of objects with the future trajectory of the host vehicle. In FIG. 3 reference sign 60 denotes the host vehicle having a future trajectory which may be estimated by the current position of the host vehicle; the current heading 64 of the host vehicle; vehicle input data such as steering angle, acceleration; and road geometry. The traffic situation includes two external objects, a first vehicle 66 and a trailing vehicle 68. The velocity of the trailing vehicle is greater than the velocity of the first vehicle. At the current scenario, the trailing vehicle has a first future trajectory 70 where the trailing vehicle 68 will follow the current heading 72 of the trailing vehicle. Since the velocity of the trailing vehicle 68 is greater than the velocity of the first vehicle, a conflict event exists between a future trajectory 74 of the first vehicle and the first future trajectory 70 of the trailing vehicle. However, using a future trajectory estimator 44 of the type described above, which future trajectory estimator 44 first generates a set of future trajectories for each object, which set of future trajectories includes all possible future control inputs selected from a set of typical human driver actions under consideration of the boundary conditions due to the restrictions of movement of the objects, also a second future trajectory 76 where the trailing vehicle 68 will avoid collision with the first vehicle 66 by passing the first vehicle 66 in the neighbouring lane 78 is generated by the future trajectory estimator 44. Since the risk for a conflicting event is smaller for the second future trajectory 76, than for the first future trajectory 70, the second future trajectory 76 is selected by the future trajectory estimator 44 as the most likely future trajectory. The future trajectory 76 of the trailing vehicle is a result from consideration of the interaction between future trajectories 70,74 of a pair of objects 66, 68 external to the host vehicle. Since conventional future trajectory detectors, which only compares the future trajectory of each external object with the future trajectory of the host vehicle would come to the conclusion that it is safe for the host vehicle 60 to enter the neighbouring lane 78 because the future trajectories of the external objects 70, 74, when no interaction between future trajectories of external objects is considered, would be maintained within the upper lane 80 in the traffic situation described in FIG. 3.

Figure 4:
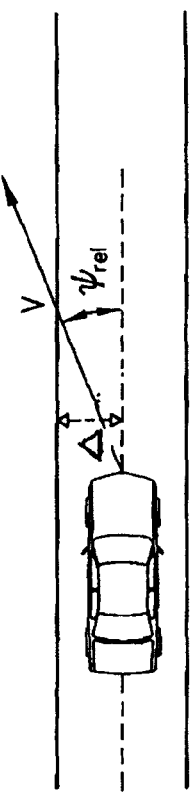
FIG. 4 illustrates the parameters of the lane exit control block.

According to the invention the output from the future trajectory estimator 44 is entered into a lane exit control block 46. In the lane exit control block 46 it is determined in a lane exit control block 46 whether the driver is making an attempt to exit the lane. The lane exit control block 46 verifies that the host vehicle is making an attempt to leave the lane based on the vertical distance $\Delta$ to the edge of the lane, the velocity v of the host vehicle and the heading angle $\Psi_{rel}$, relative to the road geometry. FIG. 4 illustrates the parameters of the lane exit control block. When it is predicted that the host vehicle will leave the lane within shortly, the lane exit control block generates an affirmative output signal. The decision can be made for instance by comparing the predicted time or distance before the vehicle leaves the lane exceeds a threshold, which threshold may be fixed or depend on for instance the velocity of the vehicle. In a future conflict estimator control block 50 included in the lane exit control block it is determined if the future trajectory 82 of the host vehicle is involved in a conflicting event. Future trajectory 82 of the host vehicle is a future trajectory based on the verification of an attempt to leave the lower lane 84 in the traffic situation designed in FIG. 3. The future conflict estimator 50 furthermore verifies if the future conflict detected is within the neighbouring lane 78 into which the host vehicle makes an attempt to enter. In one embodiment of the invention, the future conflict estimator 50 verifies a conflicting event and sends a control signal to a lane change prevention unit 51 including a lateral feedback controller 52 which generates a control signal to a steering actuator 54 of the vehicle. The lateral feedback controller applies a control signal to generate a torque in the opposite direction of the steering torque generated by the driver input signal, either so as to prevent the driver form changing lane or a smaller torque which may be overcome by the driver, which torque alerts the driver of the existence of a danger of entering the neighbouring lane, but does not prevent the driver from entering the neighbouring lane.

In a preferred embodiment the future conflict estimator control block 50 also determines if the current lane of the host vehicle is safe, that is if the a future trajectory 62 of the host vehicle within the current lower lane 84 does not include any conflicting events with external objects. If for instance an obstacle 86 is present in the current lane 84, the future conflict estimator control block 50 will not activate the lateral feedback controller 52 so as to either alert the driver or so as to prevent the driver of leaving the lane.

The future trajectory estimator 44 is preferably, as have been described above, of the type described in the article "Monte Carlo Road Safety Reasoning" referred to above. Alternatively the future trajectory estimator 44 is of a simpler type, which estimates the future trajectories in a feedback predictor (which may be of based on a Kalman filter) based on current velocity, heading angle and road geometry without generating a plurality of possible future trajectories for each object from which a most likely future trajectory may be selected by Monte Carlo sampling. In this type of estimator, a conflicting event will not be avoided by generating a more likely future trajectory for the object. If this type of future trajectory estimator is used, the future conflict estimator control block may detect whether a conflicting event exist between a pair of objects in the heading direction of the host vehicle such that the future trajectory may be affected by this conflicting event. The conflicting event between the pair of external objects may not necessarily take place in the neighbouring lane 78 if this type of future trajectory estimator 44 is used since this type may not predict amended future trajectories of the external objects. However, in the event the future trajectory estimator is arranged as a feed back controller, any change in the trajectory of the external objects will be detected by the sensor system 18 and will form basis for an updated prediction of the future trajectory of the external object. For this reason, this simpler type of future trajectory estimator may also generate accurate predictions of the future trajectories. Normally the judgement that the conflicting event may affect the host vehicle is only generated if the conflicting event between the external objects takes place in the neighbouring lane into which the host vehicle attempts to enter. In the event the conflicting event may affect the host vehicle the future conflict estimator control block may generate a control signal to the lateral feedback controller 52, either as a direct result or after verifying that no conflicting events exist in the current position of the host vehicle. Naturally the future conflict estimator control block would activate the lateral feedback controller 52 in the event a future conflict event between the host vehicle and an external object exists in a neighbouring lane.

Furthermore, the future trajectory estimator 44 may alternatively directly receive input signals from the sensor system without the use of the state estimator 42.

What is claimed is:

1. A method for collision avoidance for a host vehicle comprising:

receiving input data relating to a set of objects external to said host vehicle, said objects being detected by a sensor system arranged on said host vehicle, wherein an object position (r,Φ), and an object velocity (ṙ) are associated with each object in said set of objects by the sensor system, the input data defining a current state of each object;

estimating future trajectories of each external object, while considering influence by the future trajectories of the other external objects;

determining that a driver of the host vehicle is making an attempt to effect a lane change from a current lane into a neighboring lane, the determination made by sensing a steering torque generated by the driver;

determining if the future trajectory of the host vehicle conflicts with one of the estimated future trajectories of the external objects in the neighbouring lane; and applying a corrective torque in the direction against the steering torque generated by the driver to effect the lane change in the event the conflict with one of the estimated future trajectories in the neighbouring lane is detected.

2. A method according to claim 1, characterised in that the method step of estimating future trajectories of each external object, while considering influence by the future trajectories of the other external objects includes the steps of:
- associating a plurality of future control input signals with each external object, where each future control signal will generate together with the current state of each external object a separate future path in a state update equation; and
- determining future trajectories for each of the objects, by selecting one of the most probable future paths as the future trajectory.

3. A method according to claim 2, characterised in that, for each external object, the most probable path is selected as the future trajectory.

4. A method according to claim 2, characterised in that each of said future control input signals include a one or more dimensional variable.

5. A method according to claim 4, characterised in that each of said future control input signal includes the variables acceleration (a) and steering angle ($\theta$).

6. A method according to claim 5, characterised in that each of said future control input signal is constituted by the variables acceleration (a) and steering angle ($\theta$).

7. A method according to claim 4, characterised in that said plurality of future paths for each external object are generated by, at each step in a plurality of discrete time steps together forming a prediction horizon, selecting a plurality of values of each variable, wherein said values are selected within a predetermined interval.

8. A method according to claim 7, characterised in that a probability number is associated with each value of the variable.

9. A method according to claim 8, characterised in that an aggregate probability for each future path at the prediction horizon is calculated.

10. A method according to claim 7, characterised in that said plurality of values of each variable are selected by random.

11. A method according to claim 2 characterised in that any future path generating a conflicting event between the future trajectory paths of at least two objects, will be rejected as improbable future trajectory paths for the objects involved.

12. A method according to claim 1, characterised in that in the event a conflict is detected between a future trajectory of the host vehicle in the current lane and one of the estimated future trajectories of the external objects in the current lane, the application of the corrective torque is prevented even in the case where the conflicting event in the neighboring lane is detected.

13. A method according to claim 1, characterised in that the future trajectories are estimated by determining whether the objects will mutually affect each other due to a risk of conflict between the future trajectories of at least one pair of objects.

14. A method according to claim 13, characterised in that the future conflicts are estimated by determining if a future trajectory of the host vehicle in the current lane does not include any conflicting events with external objects, and the lane change is prevented if no conflicting events with external objects are detected in the current lane.

15. A method according to claim 13, characterised in that output data from the sensor system is processed in a state estimator which estimates the states of all external objects, the host vehicle and the road geometry.

16. A method according to claim 13 characterised in that the future trajectory of an external object is corrected in order to avoid a conflict, when a conflict event between two external objects is detected.

17. A method according to claim 13 characterised in that the locus of the conflicting event is determined, and it is further determined whether this conflicting event will have an impact of the host vehicle or not.

18. A method for collision avoidance for a host vehicle comprising:
- defining a current state of each of a plurality of objects external to the host vehicle, the current states being based upon a position and a velocity of each of the external objects as detected by a sensor system on the host vehicle;
- associating a plurality of future control input signals with each of the external objects;
- using each future control input signal together with the current state of each external object to generate a separate future path in a state update equation;
- determining a future trajectory for each of the external objects by selecting one of the most probable future paths;
- determining that a driver of the host vehicle is generating a steering torque indicating an attempt to effect a lane change from a current lane into a neighboring lane;
- determining that a future trajectory of the host vehicle after the attempted lane change conflicts with one of the future trajectories of the external objects in the neighbouring lane; and
- applying a corrective torque in a direction against the steering torque generated by the driver to effect the lane change.

* * * * *